United States Patent
Postniece et al.

(10) Patent No.: US 10,846,472 B2
(45) Date of Patent: Nov. 24, 2020

(54) AUTOMATIC ENCODER OF LEGISLATION TO LOGIC

(71) Applicant: Commonwealth Scientific and Industrial Research Organisation, Acton (AU)

(72) Inventors: Linda Postniece, Acton (AU); Leif Hanlen, Acton (AU); Travis Simon, Acton (AU); Neil Bacon, Acton (AU); Guido Governatori, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 27 days.

(21) Appl. No.: 16/344,701

(22) PCT Filed: Oct. 26, 2017

(86) PCT No.: PCT/AU2017/051175
§ 371 (c)(1),
(2) Date: Apr. 24, 2019

(87) PCT Pub. No.: WO2018/076058
PCT Pub. Date: May 3, 2018

(65) Prior Publication Data
US 2020/0050660 A1    Feb. 13, 2020

(30) Foreign Application Priority Data
Oct. 26, 2016    (AU) ................................ 2016904359

(51) Int. Cl.
*G06F 40/205*    (2020.01)
*G06F 16/36*    (2019.01)
(Continued)

(52) U.S. Cl.
CPC ............ *G06F 40/205* (2020.01); *G06F 16/36* (2019.01); *G06F 40/289* (2020.01); *G06F 40/40* (2020.01); *G06N 5/003* (2013.01); *G06Q 50/18* (2013.01)

(58) Field of Classification Search
CPC ........ G06F 40/205; G06F 16/36; G06F 40/40; G06F 40/289; G06N 5/003; G06Q 50/18
See application file for complete search history.

(56) References Cited

U.S. PATENT DOCUMENTS 7,287,016 B2    10/2007   Johnson et al.
8,515,733 B2    8/2013    Jansen
(Continued)

FOREIGN PATENT DOCUMENTS

WO    WO 2004/100094 A2    11/2004
WO    WO 2005/086037 A1    9/2005

OTHER PUBLICATIONS

Extended European Search Report for corresponding European Application No. 17863710.4, dated Mar. 6, 2020.
(Continued)

*Primary Examiner* — Mohammad K Islam
(74) *Attorney, Agent, or Firm* — Brinks Gilson & Lione

(57) ABSTRACT

This disclosure relates to computationally efficient processing of legal texts. A language processor extracts from text blocks atomic literals that correspond to terms in the legal text and that are shared across logic expressions for different text blocks. A mapper maps the text blocks into a logic expression of the atomic literals and a logic engine evaluates the logic expression based on one or more assignments of the atomic literals. A user interface comprises user input elements associated with the atomic literals. Upon user interaction with the user input elements, an assignment is created of the atomic literal associated with the user input elements and the logic engine is called to evaluate the logic
(Continued)

expression based on the created assignment. The user interface changes based on the evaluation to thereby provide legal advice in the form of remaining atomic literals.

22 Claims, 8 Drawing Sheets

(51) Int. Cl.
*G06F 40/40* (2020.01)
*G06F 40/289* (2020.01)
*G06N 5/00* (2006.01)
*G06Q 50/18* (2012.01)

(56) References Cited

U.S. PATENT DOCUMENTS

| | | |
|---|---|---|
| 8,794,972 B2 | 8/2014 | LoPucki |
| 8,914,507 B2 | 12/2014 | Donoho et al. |
| 2003/0055720 A1 | 3/2003 | Overton et al. |
| 2007/0209004 A1 | 9/2007 | Layard |
| 2010/0037132 A1 | 2/2010 | LoPucki |
| 2010/0268528 A1 | 10/2010 | Raskina et al. |
| 2010/0324951 A1 | 12/2010 | Northover |
| 2010/0332520 A1* | 12/2010 | Lu .................. G06Q 50/18 707/769 |
| 2011/0010163 A1 | 1/2011 | Jansen |
| 2011/0106731 A1 | 5/2011 | Pearson et al. |
| 2011/0112973 A1* | 5/2011 | Sanghvi ............ G06Q 30/018 705/317 |
| 2013/0096955 A1 | 4/2013 | Pesci-Anderson et al. |
| 2015/0186504 A1 | 7/2015 | Gorman et al. |
| 2016/0103823 A1 | 4/2016 | Jackson, Jr. et al. |
| 2016/0188568 A1 | 6/2016 | Srinivasan |

OTHER PUBLICATIONS de Marneffe, Marie-Catherine, et al., "Stanford typed dependencies manual," Revised for the Stanford Parser v. 3.7.0 in Sep. 2016; retrieved from the Internet on May 4, 2017: http://nlp.stanford.edu/software/dependencies_manual.pdf.

Dragoni, M., et al., "Automated Rules Generation from Natural Language Legal Texts," published Jun. 2015, pp. 1-7; retrieved from the Internet May 3, 2017: https://ts.data61.csiro.au/publications/nictaabstracts/8712.pdf.

FICO The FICO Blaze Advisory Business Rules Management System—How It Works—updated for Release 6.5; https://web.archive.org/web/20150911100135/http://www.fico.com/en/wp-content/secure_upload/Blaze_Advisor_How_It_Works_6_5_1262WP.pdf, published Sep. 11, 2015.

Governatori, Guido, et al., "Regorous: A Business Process Compliance Checker," ICAIL, pp. 245-246, Jun. 2013; retrieved from the Internet May 4, 2017: https://pdfs.semanticscholar.org/f2cc/486c672d5241f1df2c301e769382d24929a1.pdf.

International Search Report for corresponding International application No. PCT/AU2017/051175, dated Nov. 15, 2017.

Written Opinion of the International Searching Authority for corresponding International application No. PCT/AU2017/051175, dated Nov. 15, 2017.

\* cited by examiner

Additional Questions

As you answer the questions on this form, redundant questions will be eliminated from the form. The intent is to let you see how your answers affect the remaining questions on the form, rather than creating a user-focused experience.

| Question | | |
|---|---|---|
| Will you have a reasonable expectation of profit? —304 | Yes | No |
| Will you be engaging in an activity in the form of an adventure? | Yes | No |
| Will your activity be in the form of a lease, license or other grant of interest in property? | Yes | No |
| Does the superannuation fund have a trustee? | Yes | No |
| Will you be an employee of the company? | Yes | No |
| Will you carry on activity in the form of a business? | Yes | No |
| Are you registering as a Corporations Act company? | Yes | No |
| Will you be carrying out activity on behalf of a State or Territory? | Yes | No |
| Are you the trustee of an ancillary fund covered by ITAA? | Yes | No |
| Will you be carrying out activity by corporation sole for public purpose? | Yes | No |
| Are you the trustee of an ancillary fund that would be covered by ITAA if it had an ABN? | Yes | No |
| Will you be carrying out activity on behalf of the Commonwealth? | Yes | No |
| Will you be a trustee of a fund that accepts deductible gifts? | Yes | No |
| Are you the trustee of a charitable fund? | Yes | No |

Fig. 3

Additional Questions

As you answer the questions on this form, redundant questions will be eliminated from the form. The intent is to let you see how your answers affect the remaining questions on the form, rather than creating a user-focused experience.

Will you have a reasonable expectation of profit? —304    [Yes] [No] ←302 303

~~Will you be engaging in an activity in the form of an adventure?~~

~~Will your activity be in the form of a lease, license or other grant of interest in property?~~

~~Does the superannuation fund have a trustee?~~

Will you be an employee of the company?    [Yes] [No]

~~Will you carry on activity in the form of a business?~~

Are you registering as a Corporations Act company?    [Yes] [No]

Will you be carrying out activity on behalf of a State or Territory?    [Yes] [No]

~~Are you the trustee of an ancillary fund covered by ITAA?~~

~~Will you be carrying out activity by corporation sole for public purpose?~~

Are you the trustee of an ancillary fund that would be covered by ITAA if it had an ABN?    [Yes] [No]

Will you be carrying out activity on behalf of the Commonwealth?    [Yes] [No]

Will you be a trustee of a fund that accepts deductible gifts?    [Yes] [No]

Are you the trustee of a charitable fund?    [Yes] [No]

Fig. 4

AUTOMATIC ENCODER OF LEGISLATION TO LOGIC

CROSS-REFERENCE TO RELATED APPLICATIONS

This application is the U.S. National Stage application of PCT Application No. PCT/AU2017/051175, filed on Oct. 26, 2017, designating the United States, which claims priority to Australian Patent Application 2016904359, filed Oct. 26, 2016, which are incorporated herein by reference.

TECHNICAL FIELD

This disclosure relates to computationally efficient processing of legal texts by specialised computer systems and methods.

BACKGROUND

Legal texts, such as legislative texts including acts and regulations, are often difficult to analyse by computers due to a large number of interrelated sections. This makes the computerised analysis of entire acts or even a collection of acts and regulations time-consuming and inaccurate. For larger collections of legal texts the processing power and memory of common computer systems are not sufficient when using current methods.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

An online webserver for automated legal advice comprises:
a legal text data input to receive legal text and splitting the legal text into multiple text blocks;
a language processor to perform natural language processing on each of the multiple text blocks to extract atomic literals corresponding to terms in the legal text;
a mapper to map the text blocks into a logic expression of the atomic literals;
a logic engine to evaluate the logic expression based on one or more assignments of the atomic literals;
a user interface module to
create a user interface comprising multiple user input elements, each of the multiple user input elements being associated with one of the atomic literals,
monitor user interaction with the user interface to detect user interaction with one of the multiple user input elements,
upon detection of user interaction with one of the multiple user input elements, creating an assignment of the atomic literal associated with the one of the multiple user input elements and calling the logic engine to evaluate the logic expression based on the created assignment, and
change the user interface based on evaluating the logic expression to thereby provide legal advice in the form of remaining atomic literals; and
a network connector to communicate with a client device by receiving user input from the client device and provide the user interface to be displayed on the client device.

It is an advantage that the mapping of the text blocks to the logic expression allows automatic reasoning of rules that are represented by natural language in the legal text. The user interface allows a user to conveniently support the reasoning by providing input that causes the creation of assignments to the literals in the logic expression to thereby interactively browse the logic rules. It is a further advantage that the process of language processing of text blocks, mapping and evaluating the logic is computationally efficient, which allows the processing of large legal texts, which would otherwise be too time consuming or not at all possible on existing computer hardware. For example, several different acts and regulations can be processed and mapped into a logic expression in a matter of seconds and the delay between the user input and the user interface update can be below one second.

The language processor may be further configured to determine a parse tree of each of the text blocks and the mapper may be configured to map the text blocks into the logic expression based on the parse tree.

It is an advantage that the parse tree efficiently represents the grammatical structure of the text blocks which can then be used by the mapper to efficiently and robustly map the text blocks into the legal expression.

The mapper may be further configured to map the text blocks into the logic expression based on heuristics.

The mapper may be further configured to search for an override conjunction ('unless') in that text block and upon finding an override conjunction in that text block at a find position, split the text block at the find position into an earlier first text sub-block before the find position and a second text sub-block after the find position.

Since override conjunctions occur frequently in legal texts, it is an advantage that searching for an override conjunction addresses a large proportion of rules encoded by the legal text.

The mapper may be further configured to map the first sub-block into a first logic expression and map the second text sub-block into a second logic expression that overrides the first logic expression.

The mapper may be further configured to search for a conditional conjunction in that text block and upon finding a conditional conjunction in that text block, splitting the text block into an earlier first text sub-block and a later second text sub-block.

The mapper may be further configured to map the first sub-block into a first logic expression and map the second text sub-block into a second logic expression that implies the first logic expression.

Splitting the text block may be based on a parse tree generated by the language processor and having a first sub-tree and a second sub-tree connected at a node representing the conditional conjunction and the first text sub-block represents the first sub-tree and the second text sub-block represents the second sub-tree.

It is an advantage that considering the parse tree leads to a robust identification of clauses in conditional sentences that would otherwise be difficult to discern. Further, considering two sub-trees is computationally more efficient that processing the individual words of the entire phrase.

The legal text data input may be configured to split the legal text into paragraphs.

The multiple user input elements may comprise binary input elements.

The user interface module may be configured to change the user interface by reducing the multiple user input elements.

Reducing the multiple user input elements may comprise eliminating, by the logic engine, atomic literals in the logic expression based on the assignment of the atomic literal associated with the one of the multiple user input elements and de-activating, by the user interface module, user input elements associated with the eliminated atomic literals.

It is an advantage that eliminating logic literals is computationally efficient, which allows a real-time response to the user input.

The language processor may be configured to determine a similarity between atomic literals and a reference atomic literal.

The user interface module may be configured to
create a user interface comprising one or more user input elements, each of the one or more user input elements being associated with one of the atomic literals based on the similarity between the one of the atomic literals and the reference atomic literal,
monitor user interaction with the user interface to detect user interaction with one of the one or more user input elements,
upon detection of user interaction with the one of the one or more user input elements, merging the atomic literal associated with the one of the multiple user input elements with the reference atomic literal in the logic expression.

The language processor may be configured to determine the similarity based on common words between a first part of the legal text associated with each of the atomic literals and a second part of the legal text associated with the reference atomic literal.

The logic expression may be a deontic defeasible logic expression.

It is an advantage that deontic defeasible logic can easily represent imperatives commonly found in legal texts as well as overriding clauses also commonly found in legal texts.

The language processor may comprise a Stanford CoreNLP parser.

The logic engine may comprise a SPINdle logic reasoner engine.

The atomic literals may comprise numerical literals and may comprise Boolean literals.

A method for creating logic rules from legal text comprises:
splitting the legal text into multiple text blocks;
performing natural language processing for each of the text blocks to extract atomic literals corresponding to terms in the legal text; and
mapping each of the text blocks into a logic expression of the atomic literals, the logic expression representing logic rules described by the legal text.

Performing natural language processing may comprise determining a parse tree for each of the text blocks and mapping each of the text blocks into the logic expression is based on the parse tree.

Mapping each of the text blocks into the logic expression may be based on heuristics.

A computer system for creating logic rules from legal text comprises:
a data input port to receive legal text;
a processor to
split the legal text into multiple text blocks;
perform natural language processing for each of the text blocks, to extract atomic literals corresponding to terms in the legal text; and
map each of the text blocks into a logic expression of the atomic literals, the logic expression representing logic rules described by the legal text
a data output port to create a visual representation of the logic expression.

Optional features described of any aspect of method, computer readable medium or computer system, where appropriate, similarly apply to the other aspects also described here. In particular, steps performed by the language processor, the mapper, the logic engine or the user interface module may be steps of the method and may be performed by the processor of the computer system. It is also noted that the above steps may be performed by separate entities or elements of a distributed computer system. In that sense, it should be understood that the above statements include within their scope implementations in which method steps may occur at different times, in different locations and with different operators providing input.

BRIEF DESCRIPTION OF DRAWINGS

An example will be described with reference to

FIG. 3 illustrates an example user interface presenting questions and possible answers to a user.

FIG. 4 illustrates the elimination of literals after the user selects an answer.

DESCRIPTION OF EMBODIMENTS

Figure 1:
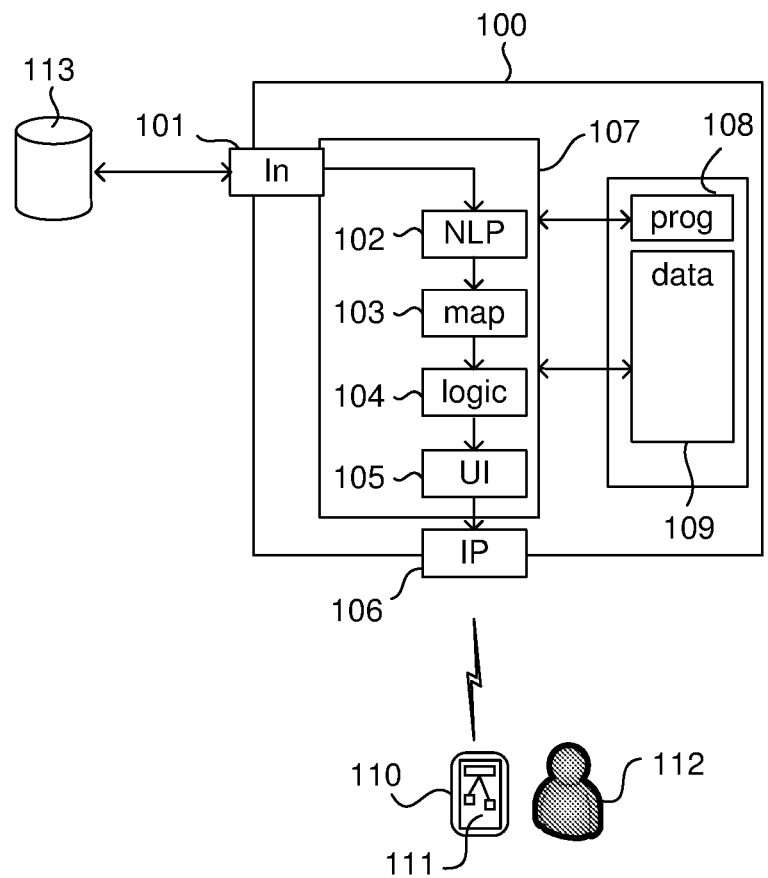
FIG. 1 illustrates an online webserver for automated legal advice.

There is a need for a computationally more efficient computerised analysis of legal texts and in particular, for the analysis of interrelated collections of legal texts. This disclosure provides systems and methods that split the legal texts into blocks, such as paragraphs or sections and then utilise natural language processing engines to pre-process each block. A mapper then maps each block into a logic expression. This way, a single logic expression may be derived for multiple text blocks or even all text blocks. The logic expression allows computationally efficient processing of input values and elimination of atomic literals by way of a logic reasoning engine. Therefore, some embodiments described herein overcome the problem of excessive computational complexity when processing large collections of legal text.

There are a large number of applications, which include compliance checks. Especially for small entities where the annual turnover does not justify the engagement of legal counsel, it is often difficult and time consuming to determine the legal requirements for running their businesses. For example, opening a café with an alcohol licence can be a complicated legal process and depends on many options, such as opening times, number of staff and size. Based on the derived logic expression and the reasoning engine it is now possible to step the user through the various requirements and efficiently calculate the implications from the user's answers.

Definitions

For convenience, the below definitions are provided for easier understanding but are not intended to limit the scope of the disclosed invention.

A document is part or all of a piece of regulation, for example: all or part of an Act or other instrument that is an official source of rules. The text of all documents may be referred to as "legislation".

A document consists of a number of text blocks, many of which may have logic content that is to be captured as rules in a logic expression. Typically, a document is an entire piece of legislation minus any pre-amble.

A text block is a single clause of legislation, for example a single sentence, or a multi-line paragraph. The text blocks in a document that have logic content, typically have one or more rules associated with them.

A rule is a logic statement linking a condition with a conclusion. For example, the following is a rule
If document is an approved form
Then person provide TFN is permitted form is identified, if applicable, rather than simply using the English word "not" in the atom text itself. In other words, the "subject-verb-object" text of the atom itself may be always positive.

| Concept | Rule |
| --- | --- |
| a person provides their TFN | person provide TFN |
| a person does not provide their TFN | opposite of person provide TFN |

Logic that is concerned with the above modalities is referred to as deontic logic. The term "deontic logic" appears to have arisen in English as the result of C. D. Broad's suggestion to von Wright (von Wright 1951); Mally used "Deontik" earlier to describe his work (Mally 1926). Both terms derive from the Greek term, $\delta_{\epsilon o \nu}$, for 'that which is binding', and ικ, a common Greek adjective-forming suffix for 'after the manner of', 'of' the nature of, 'pertaining to', 'of', thus suggesting roughly the idea of a logic of duty. (The intervening "τ" in "$\delta_{\epsilon o \nu \tau \iota \kappa}$" is inserted for phonetic reasons.) In that sense, Deontic logic is that branch of symbolic logic that has been the most concerned with the contribution that the following notions make to what follows from what:

| | |
| --- | --- |
| permissible (permitted) | must |
| impermissible (forbidden, prohibited) | supererogatory (beyond the call of duty) |
| obligatory (duty, required) | indifferent/significant |
| omissible (non-obligatory) | the least one can do |
| optional | better than/best/good/bad |
| ought | claim/liberty/power/immunity |

The above rule may be interpreted as "whenever it is the case that 'document is an approved form', it is then the case that 'the person is permitted to provide TFN'". Each rule contains some atoms, and an atom may also have a modality associated with it.

Atoms are the basic building blocks of our logic system. Each atom can be thought of as a factual statement: it may be either true or false in a particular scenario. In the above example, "document is an approved form" and "person provide TFN" are atoms. An atom is usually phrased as a "subject-verb-object" sentence. An atom may also be referred to as atomic literal.

Modalities provide the atom's direction, such as "is permitted" in the above example.
Modal atoms
An atom can be plain (no modality) or decorated by a modality. The common modalities are:
Permitted—the action is permitted
Forbidden—the action is forbidden/prohibited
Obligatory—the action is prescribed as mandatory
In some cases, the Obligatory modality may require further nuance and the user may choose to describe a specific type of obligation. See section "Specific types of obligations" below.

Negated atoms: An atom may occur in a rule in a positive form (for example "person provide TFN") or in a negative form (for example "opposite of business carried on licensed premises is same business specified in licence"). It is useful for the logical correctness of the system that the negative Defeasible logic is logic that allows defeasible reasoning, which is a kind of reasoning that is rationally compelling though not deductively valid. The truth of the premises of a good defeasible argument provide support for the conclusion, even though it is possible for the premises to be true and the conclusion false. In other words, the relationship of support between premises and conclusion is a tentative one, potentially defeated by additional information.

Naming atoms: In one example, the text of an atom (e.g. person provide TFN) is not used by the logic engine. The name is for human readers of the rules, and for the unique identification of the atoms. The objective of the atom name is to allow a person to easily understand the underlying "truth statement" without need for the context of the text.

It is useful to develop a common naming convention for atoms, to allow readability and consistency across legislation. The text can be any phrase; however, some suggested conventions are:
Use a "Subject-Verb-Object" form, where possible
For example, use text such as "person sell liquor"
Avoid punctuation
"this, object" and "this object" are different atoms: the distinction is difficult to see punctuation modifies the semantics of the sentence
Phrase the atom in a positive form, that is, avoid negation, or similar modifiers (see above)
Keep it simple
Common types of rules: A rule without any conditions and a single conclusion simply asserts the conclusion. For example, the rule person sell liquor is forbidden
asserts that a person is forbidden to sell liquor. These assertion rules are commonly used for "default cases" together with another rule overriding the rule for "exception cases". More on that below.

A rule with one or more conditions, and a single conclusion, stipulates that whenever all the conclusions hold then the condition holds. For example, the rule
If on-premises licence is granted
And authority endorse licence for liquor consumption away from licensed premises
Then trading hour end at 10 pm is an ongoing obligation
asserts that whenever both conditions hold, the conclusion should hold. The conditions in this case are the atoms "on-premises licence is granted" and "authority endorse licence for liquor consumption away from licensed premises". The conclusion is a modal atom "trading hour end at 10 pm is an ongoing obligation".

Note that where a rule has more than one condition, these are always linked together via "AND". The next two sections cover some more complex cases, such as when you need to create a number of rules for a particular clause, or link a number of conditions using "OR".

Relating rules to each other

A text-block may contain more than one rule. There are typically two cases where this is useful:
The text-block contains a number of list items.
(1) A person must not:
(a) erect a structure or carry out a work in, on or over a public road; or
(b) dig up or disturb the surface of a public road; or
(c) remove or interfere with a structure, work or tree on a public road.

The example above contains three rules:
person erect structure or carry work in on or over public road is forbidden
person dig or disturb surface of public road is forbidden
person remove or interfere with structure work or tree on public road is forbidden The text-block contains a main rule for the default case, and another rule or rules for the override/exception case.
(2) A person must not sell liquor unless the person is authorised to do so by a licence."

The example above contains two rules, and Rule (ii) overrides rule Rule (i):
Rule (i)
person sell liquor is forbidden
Rule (ii)
If person is authorised to sell liquor by licence
Then person sell liquor is permitted
Representing more complex rule structures (combining AND/OR)

In addition to the common structures above, occasionally you may encounter more complex clauses of legislation that need to be split into multiple rules. The following is a guide on how to handle these:

A clause that requires a number of modal atoms in the condition linked via OR, needs to be split into several rules such that each rule has one of these conditions. For example, "If A or B then C" is represented as two separate rules:
If A then C
If B then C A clause that requires a number of modal atoms in the conclusion linked via AND, needs to be split into several rules such that each rule has one of these conclusions. For example, "If A then C and D" is represented as two separate rules:
If A then C
If A then D Note that the above two templates can be combined. For example, a clause such as "If A or B then C and D" can be represented as four rules:
If A then C
If B then C
If A then D
If B then D The system may support rules requiring multiple modal atoms in the conclusion, linked via OR.

Specific types of obligations

The following more detailed obligation types can optionally be used with modal atoms instead of the general obligation:
Achievement (persistent, pre-emptive)
Achievement (persistent, non-pre-emptive)
Achievement (non-persistent, pre-emptive)
Achievement (non-persistent, non-pre-emptive)
Maintenance
Punctual Achievement obligations are the most common form of obligation, and must be met once only.

Achievement obligations are further split into two types: persistent and non-persistent. Each of these types can further be either pre-emptive or non-pre-emptive. The most common subtype of obligation is Achievement (persistent, pre-emptive).

Persistent obligations should be used where the obligation persists after it has been violated. e.g. if you fail to pay for a good within 7 days, there may be an obligation to pay a fine in addition to the original invoiced amount.

Non-persistent obligations are terminated by their violations. Suppose you have the obligation to provide a copy of the signed contract within 14 days otherwise the contract is invalid. This obligation is a non-persistent because the failure to provide the signed copy within the allocated deadline terminates the contract and then the obligation. Accordingly, Non-persistent obligations are mostly useful in situations where they may be terminated. They are mainly used in obligation chains where the rules represent an OR case (e.g. a complaint is either resolved OR escalated).

Pre-emptive obligations mean the obligation may be satisfied before it is triggered. For example, purchasing a good triggers an obligation to pay, but the payment may occur before or when the obligation is triggered. There are also cases where a Pre-emptive obligation can be fulfilled only before the obligation is triggered. For example, Section 54.1.d of the *Anti-Money Laundering and Counter-Terrorism Financing Act* 2006 prescribes that a report under Section 53 must be given at any time before the movement of the physical currency takes place.

Non-pre-emptive obligations mean the compliance action can only be satisfied once it has been triggered. For example, when a person asks to escalate a complaint, there may be an obligation to inform them of the escalation process in the company.

Maintenance obligations must be met continually after they are triggered (i.e. effect must be maintained through process). They are typically only used where there are prohibitions or there are continuous operations (e.g. monitoring).

Some regulations are written with words like 'maintain' but in fact signify achievement obligations. These typically relate to management processes e.g. "supplier must maintain a complaint handling process that is easy to use" actually means that when the complaint handling process is implemented, we need to checked ONCE (at least) that it is easy to use.

Punctual obligations are used very rarely, typically when reasoning about business processes. Punctual obligations indicate that the obligation needs to be met by the next step of a business process, so is dependent on the detail of the process.

The above constructs are used as elements in a logic expression to which the legal text is mapped.

Computer System

FIG. 1 illustrates an online webserver 100 for automated legal advice. The online webserver 100 comprises a legal text data input 101, a language processor 102, a mapper 103, a logic engine 104, a user interface module 105 and a network connector 106. In one example, language processor 102, mapper 103, logic engine 104 and user interface module 105 are implemented as software running on a processor 107. The software may be installed on a program memory 108 and may use data memory 109 to store results or intermediate data.

The program memory 108 is a non-transitory computer readable medium, such as a hard drive, a solid state disk or CD-ROM. Software, that is, an executable program stored on program memory 108 causes the processor 107 to perform the method in FIG. 8. Processor 107 may store the data, such as parse trees or logic expressions on data store 109, such as on RAM or a processor register.

The processor 107 may receive data, such as legal texts, from data memory 109 as well as from the input port 101 and the network interface 106, which is connected to a display device 110 that shows a visual representation 111 of the logic expression to a user 112. In one example, the processor 107 receives legal text data from a legal database 113, such as austlii.edu.au via input port 101 and user input via network interface 106, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 107 receives and processes the user input in real time. This means that the processor 107 evaluates the logic expression every time user input is received from the user device 110 and completes this calculation before the user device 110 sends the next user input. In one example, the minimum time in which the user 112 can review the questions or statements displayed to him and decide on the next input to be provided is 1 s, which means the real-time processing is performed in less than 1 s.

Although input port 101 and network interface 106 are shown as distinct entities, it is to be understood that any kind of data port may be used to receive data, such as a network connection, a memory interface, a pin of the chip package of processor 107, or logical ports, such as IP sockets or parameters of functions stored on program memory 108 and executed by processor 107. These parameters may be stored on data memory 109 and may be handled by-value or by-reference, that is, as a pointer, in the source code.

The processor 107 may receive data through all these interfaces, which includes memory access of volatile memory, such as cache or RAM, or non-volatile memory, such as an optical disk drive, hard disk drive, storage server or cloud storage. The web server 100 may further be implemented within a cloud computing environment, such as a managed group of interconnected servers hosting a dynamic number of virtual machines.

It is to be understood that throughout this disclosure unless stated otherwise, nodes, edges, graphs, trees, expressions, solutions, variables, atomic literals and the like refer to data structures, which are physically stored on data memory 109 or processed by processor 107. Further, for the sake of brevity when reference is made to particular variable names, such as "period of time" or "quantity of movement" this is to be understood to refer to values of variables stored as physical data in computer system 100.

Legal Text Input

The legal text data input 101 receives legal text and splits the legal text into multiple text blocks. For example, the legal text data input 101 is a database connector, such as a SQL connector, and executes a query for a particular Act or Regulation to retrieve the legal text from a database. In another example, the data input 101 retrieves the legal text from a web-service that provides the legal text or scrapes a website to extract the legal text from the website. For example, text data input 101 may retrieve the legal text from austlii.edu.au.

Splitting the legal text into multiple blocks may comprise splitting the legal text into paragraphs. A paragraph may be identical to a Section in the Act or a regulation in the Regulations. However, single Sections or Regulations may comprise more than one paragraph. In one example, the paragraphs are identified based on text formatting or text characters, such as additional line breaks or tabs.

The text data input 101 may store the text blocks in a local database hosted on data memory 109, such as individual records in a database table, where each record may include an identifier of the Act or Regulation.

In one example, the text data input 101 is implemented as a regular expression using the sed, Python or other program.

Language Processor

The language processor 102 performs natural language processing on each of the multiple text blocks. This way, language processor 102 extracts atomic literals corresponding to terms in the legal text. 'Atomic' in this context means that the literal comprises only a single value and cannot be split further. That is, the value of the atomic literal is either 'true' or 'false' in Boolean logic (or other values depending on the logic used). 'Literal' in this context means 'variable' and describes the fact that the value of the literal can be changed by user input or by evaluating a logic expression having that literal as an output variable, for example. In some examples, the atomic literal may refer to a non-Boolean variable, such as a numerical variable or integer. For example, the atomic literal could represent the age of a person. An extracted logic expression could then be "person.age=>18". It is noted that the output of the logic expression is a Boolean variable indicating whether or not the person's age is 18 years or older. A logic expression using this output may be "If person.age >18 then person.isAdult". The question generated may be "what is the age of the person?".

In one example, language processor 102 is implemented by the Stanford CoreNLP parser, which creates a parse tree and the nodes of the parse tree represent the atomic literals. The parse tree may also be stored in the same database as the legal text or may be stored in a graph database, such as CouchDB. Each node of the parse tree is identified by a unique node identifier such that processor 107 can reference that node.

When the user interacts with the nodes it is useful to assign relevant user-readable names to each node, which are based on the text that represents the node. For example, the legal text comprises the phrase "a person who wants to sell liquor", which is converted into a node of the parse tree by the language processor 102 representing one atomic literal. As an aside it is noted that a Boolean assignment can be created for this phrase. That is, the person either wants to sell liquor ('true'/'1') or does not want to sell liquor ('false'/'0').

It may be convenient to shorten the phrase from the legal text to allow for a more compact and more useful graphical representation to the user. This can be achieved by eliminating prepositions, articles and negations. It is noted that this does not change the meaning of the legal text as understood by the language processor 102 since the meaning is already encoded in the structure of the parse tree. Shortening the phrases only changes the labels of the nodes, which are used for human interaction.

Mapping Text Blocks to Logic Expressions

The mapper 103 maps the text blocks into a logic expression of the atomic literals. In one example, each text block is mapped to one individual logic expression, such as a tuple of input literals, operation and output literals. The tuple corresponding to each text block can then be stored on the database. It is noted that the tuples are related to each other by sharing common literals. In other words, the atomic literals correspond to terms in the legal text and are shared across logic expressions for different text block. More explicitly, a first logic expression for a text block contains a first literal and a second logic expression for a second text block contains the same first literal. Importantly, if a value is assigned to the first literal, it affects both the first and the second logic expression. In this sense, the collection of some or all tuples or the collection of some or all logic expressions can be referred to as a (larger) logic expression. More details of the mapping process are provided further below. In one example, the logic expression is stored as program code in the Scala programming language as described on http://www.scaia-lang.org/. The logic expressions are represented in a domain-specific language format (with names like Formula, Modal, Atom, etc), which may then be serialized as JSON text for sending to and from the user interface and database.

Logic Engine

The logic engine 104, which may also be referred to as a reasoning engine, evaluates the logic expression based on one or more assignments of the atomic literals, such as assignments from the user interface as described below. In one example, the logic engine 104 is implemented as the Spindle engine as available under https://sourceforge.net/projects/spindlereasoner/ and described in Lam, H.-P., and Governatori, G. 2010. On the Problem of Computing Ambiguity Propagation and Well-Founded Semantics in Defeasible Logic. In Rotolo, A.; Hall, J.; Dean, M.; and Tabet, S., eds., Proceedings of the 4th International Web Rule Symposium: Research Based and Industry Focued (RuleML-2010). Washington, D.C., USA: RuleML., which is incorporated herein by reference.

Details of the Mapping

As described above, the mapper 103 provides the mapping of output from the language processor 102 to the logic expression. For this task, the mapper 102 may use heuristics as set out in detail below. A heuristic is a process that has been observed to yield the desired result on past examples but may not have a mathematical proof of its correctness or may not always guarantee an optimal result.

For example, the mapper 103 searches for an override conjunction in a text block. Examples for an override condition may be the occurrence of the word "unless". Other examples include "except if". An override conjunction generally is used to introduce the case in which a previous statement being made is not true or valid. Upon finding an override conjunction in that text block at a find position, mapper 103 splits the text block at the find position into an earlier first text sub-block before the find position and a second text sub-block after the find position.

For example, the sentence "A person can hold a liquor licence unless the person is under 21 years old" is split into a first text sub-block "A person can hold a liquor licence" and a second text sub-block "the person is under 21 years old". In this example, the logic expressions for the first sub-block and the second sub-block are single literals.

The mapper can then map the first sub-block into a first logic expression and map the second text sub-block into a second logic expression that overrides the first logic expression. In this sense, the overriding of logic expressions represents the defeasible nature of the employed logic as described further above. In other words, the first sub-block represents a conclusion which can be false given the value of the logic expression from the second sub-block.

In another example, the mapper searches for a conditional conjunction in that text block. A conditional conjunction may include the following phrases: if, on condition that, provided (that), providing (that), presuming (that), supposing (that), assuming (that), on the assumption that, allowing (that), as long as, given that, with the provision/proviso that, with/on the understanding that, if and only if, contingent on, in the event that, allowing that and others.

Upon finding a conditional conjunction in that text block mapper 103 splits the text block into an earlier first text sub-block and a second text sub-block. The mapper then maps the first sub-block into a first logic expression and maps the second text sub-block into a second logic expression that implies the first logic expression.

Figure 2:
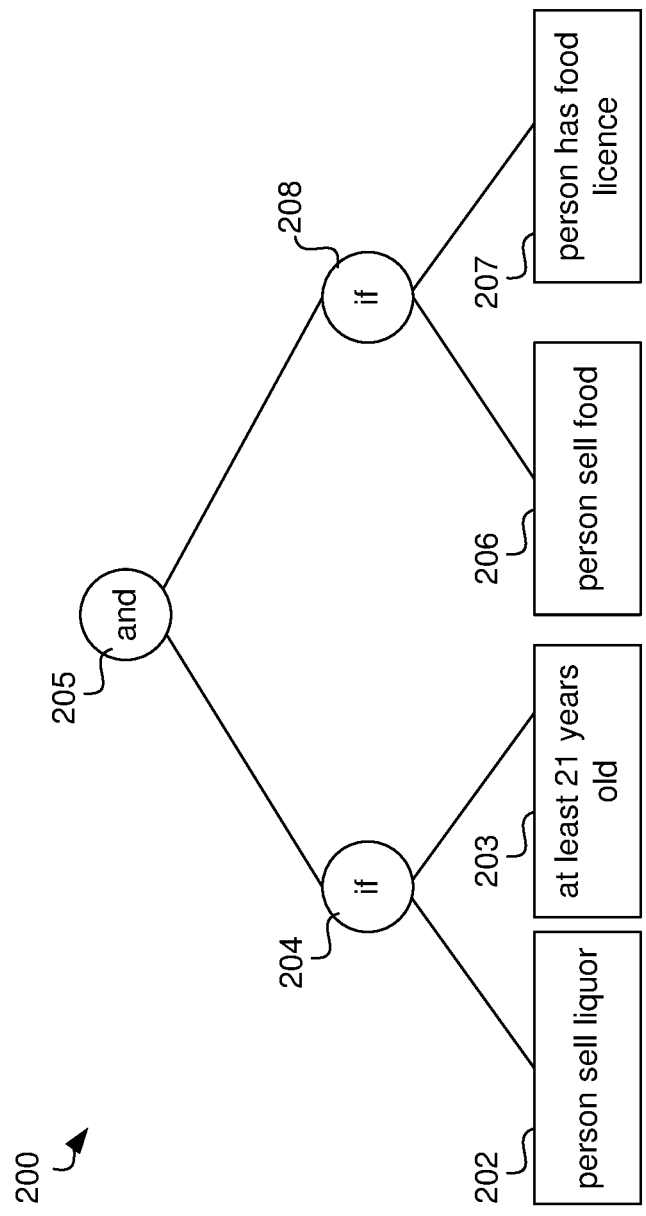
FIG. 2 illustrates an example parse tree.

In one example, mapper 103 splits the text block based on a parse tree generated by the language processor 102. The parse tree may be implemented as a Java Class:
java.lang.Object
java.util.AbstractCollection<Tree>
edu.stanford.nlp.trees.Tree For example, in the phrase "a person may hold a liquor licence if the person is at least 21 years old and may sell food if the person has a food licence", the "and" conjunction may relate to condition of being at least 21 years old or start a new expression. FIG. 2 illustrates an example parse tree 200 comprising a first sub-tree 202 and a second sub-tree 203 connected at a node 204 representing the conditional conjunction. The first text sub-block represents the first sub-tree 202 and the second text sub-block represents the second sub-tree 203. This allows the mapper 103 to identify which parts of the text block are associated with the conditional conjunction. The language processor 102 extracts the hierarchy of the sentence grammatically and generates the parse tree this way. In this example, the language processor 102 identifies an "and" node 205, which connects a further conditional clause comprising a third sub-tree 206, and a fourth sub-tree 207 connected by a further conditional node 208.

User Interface

FIG. 3 illustrates an example user interface 300 as created by the user interface module 105. User interface 300 comprises multiple user input elements, such as first button 302 and second button 303. Each of the multiple user input elements is associated with one of the atomic literals as extracted by the language processor 102, such as by using the identifier of the atomic literal in the name or send value of the button. In the example of FIG. 3, the first button 302 and second button 303 are associated with atomic literal 304.

It is noted that literal 304 is displayed in the format of a question that is created based on the legal text that defines this literal. For example, the legal text may be "a person has a reasonable expectation of profit", the label for the literal may be "has reasonable expectation of profit", the associated question 304 for the user interface "will you have a reasonable expectation of profit" and the literal identifier may be a unique random number, such as "46446267".

User interface module 105 monitors user interaction with the user interface to detect user interaction with one of the multiple user input elements. User interface module 105 may comprise a webserver and may generate HTML code that may comprise JavaScript elements. This code may then be written on a data store that is accessible over the Internet by a browser application. Monitoring user interaction may comprise receiving GET, POST, XMLHttpRequest, or other web-based commands from the browser application over the Internet. For example, when a user clicks on a button, the browser application sends the button name or button value including the identifier of the atomic literal associated with that button to the webserver 100. In one example, there are two buttons for each literal. A first button is for sending a 'true' value and a second button is for sending a 'false' value for that literal to the webserver 100.

When the webserver 100 detects the user interaction with one of the multiple user input elements, such as by receiving the button name and/or value, processor 107 creates an assignment of the atomic literal associated with the one of the multiple user input elements. For example, processor 107 replaces that literal by the selected value or creates an assignment entry in the database. Processor 107 then calls the logic engine 104 to evaluate the logic expression based on the created assignment. The logic expression represents the rules that are encoded in the legal text in an efficient format. That is, the rules can be evaluated efficiently by the logic engine without using the legal text. This avoids the need for re-parsing the legal text, which enables the real-time reaction to user input, such as within 100 ms.

Processor 107 can then change the user interface based on evaluating the logic expression to thereby provide legal advice in the form of remaining atomic literals. For example, the user interface may be a list of literal labels and for each label the user can click on 'true' or 'false' (or 'yes' or 'no'). When the user clicks on one of these values, evaluating the logic expression with the selected assignments may lead to the elimination of other literals. In that case, the user interface may remove or deactivate the eliminated literals. In this sense, the user does not provide answers to all literals but nevertheless the logic expression can be evaluated to a final value, such as a 'yes'/'no' statement on whether the compliance. In cases where the atomic literals are numerical or integers, the user may be asked to enter a numerical or integer value. It is noted, however, that the applicable test outcome may be used as a Boolean literal. For example, the question may be "what is the age of the person?" (numerical) or "is the person an adult?" (Boolean) given the test of defining an adult to be a person of 18 years or older.

FIG. 4 illustrates the elimination of literals after the user selects the "No" button 303 in FIG. 3. As can be seen in FIG. 4, a number of further questions have been changed to strike through and the corresponding user input elements deleted to indicate that these literals have been eliminated from the logic expression. Other ways of deactivating the literal may be used, such as changing the colour, such as to grey, removing the literal or adding an icon next to the literal to indicate deactivation, such as a ticked checkbox.

Referring back to FIG. 1 online webserver further comprises a network connector 106 to communicate with a client device 110 by receiving user input from the client device 110 and provide the user interface 111 to be displayed on the client device. The network connector may comprise an Apache webserver, an Angular frontend and Flask backend or other web-based technology.

Merging Literals

Figure 5:
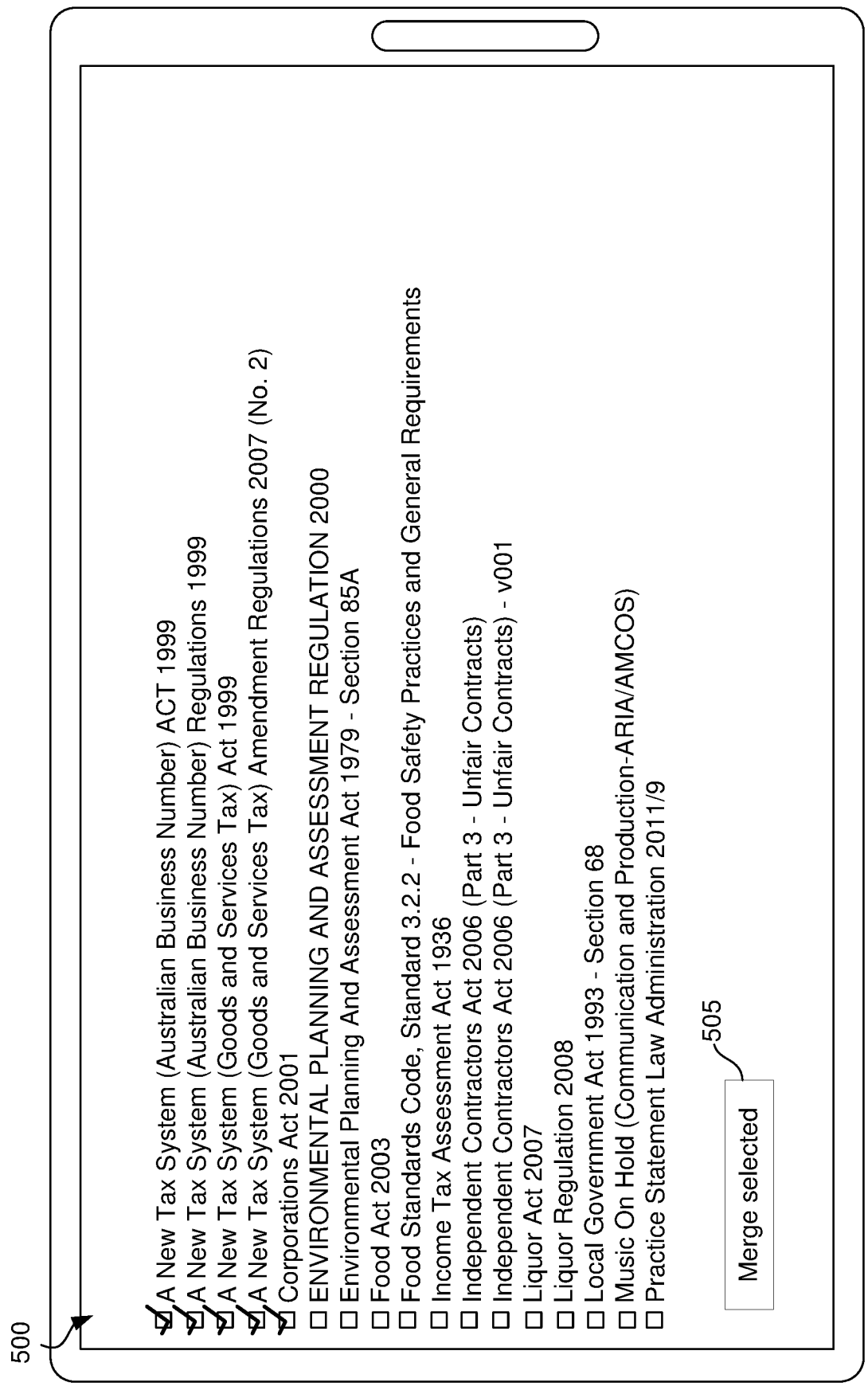
FIG. 5 illustrates a user interface for selecting multiple legal text documents.
Figure 6:
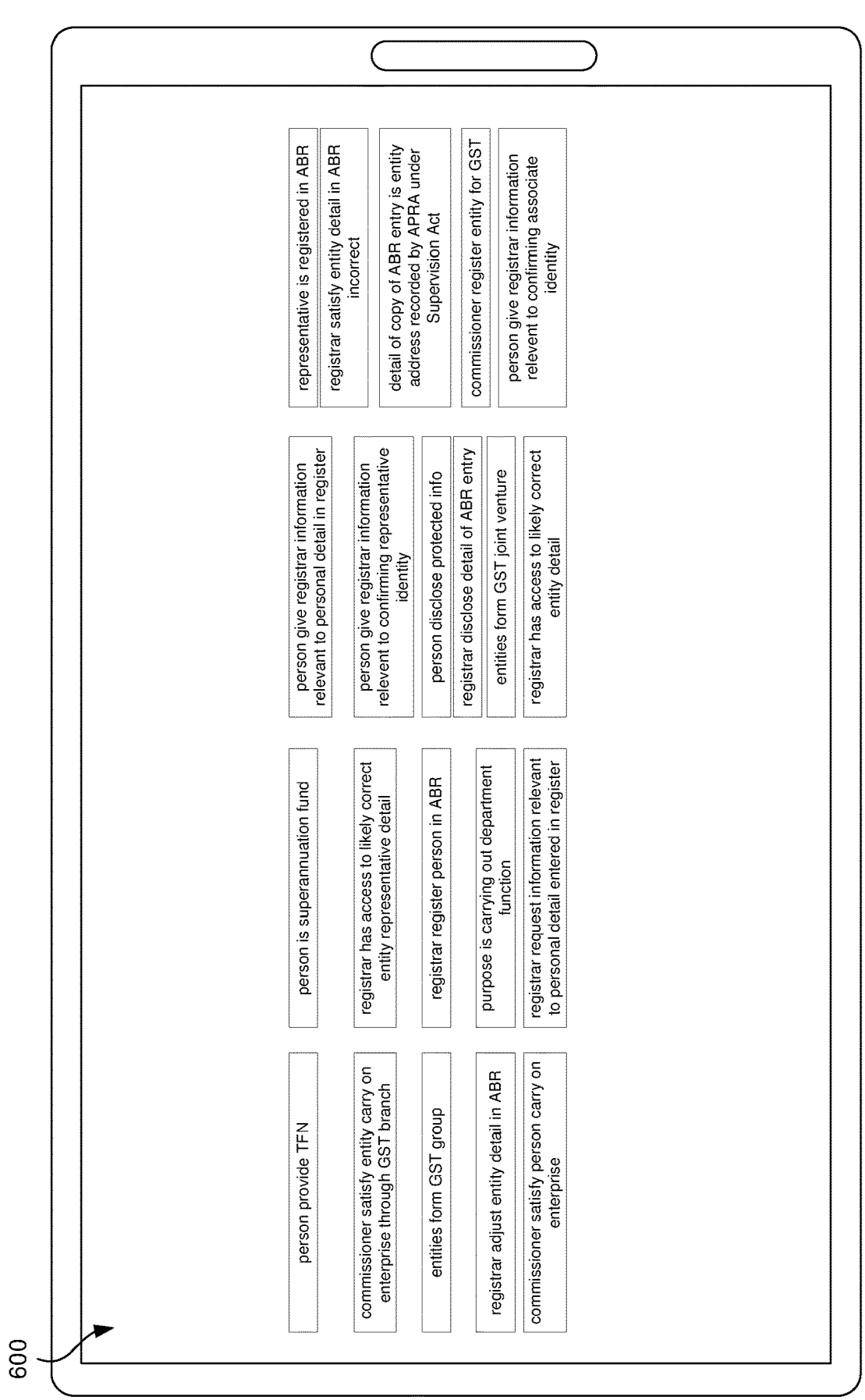
FIG. 6 illustrates a user interface showing a list of literals for the user to select.

In one example, the webserver 100 further creates graphical user interfaces that allow a user to control the extraction of atomic literals from the legal text. FIG. 5 illustrates a user interface 500 created by user interface module 105 that allows the user to select multiple legal text documents and can then activate a merge button 505. In response, user interface module 105 generates a literal selector 600 as shown in FIG. 6, which shows a list of literals. Here, the user can select one of the literals for further inspection. The language processor 102 further determines a similarity between atomic literals and a reference atomic literal. The similarity may be based on common words between a first part of the legal text (indicated at 711) associated with atomic literal 702 and a second part of the legal text (indicated at 712) associated with the reference atomic literal 703. For example, the first part of the legal text is indicated at 711

Figure 7:
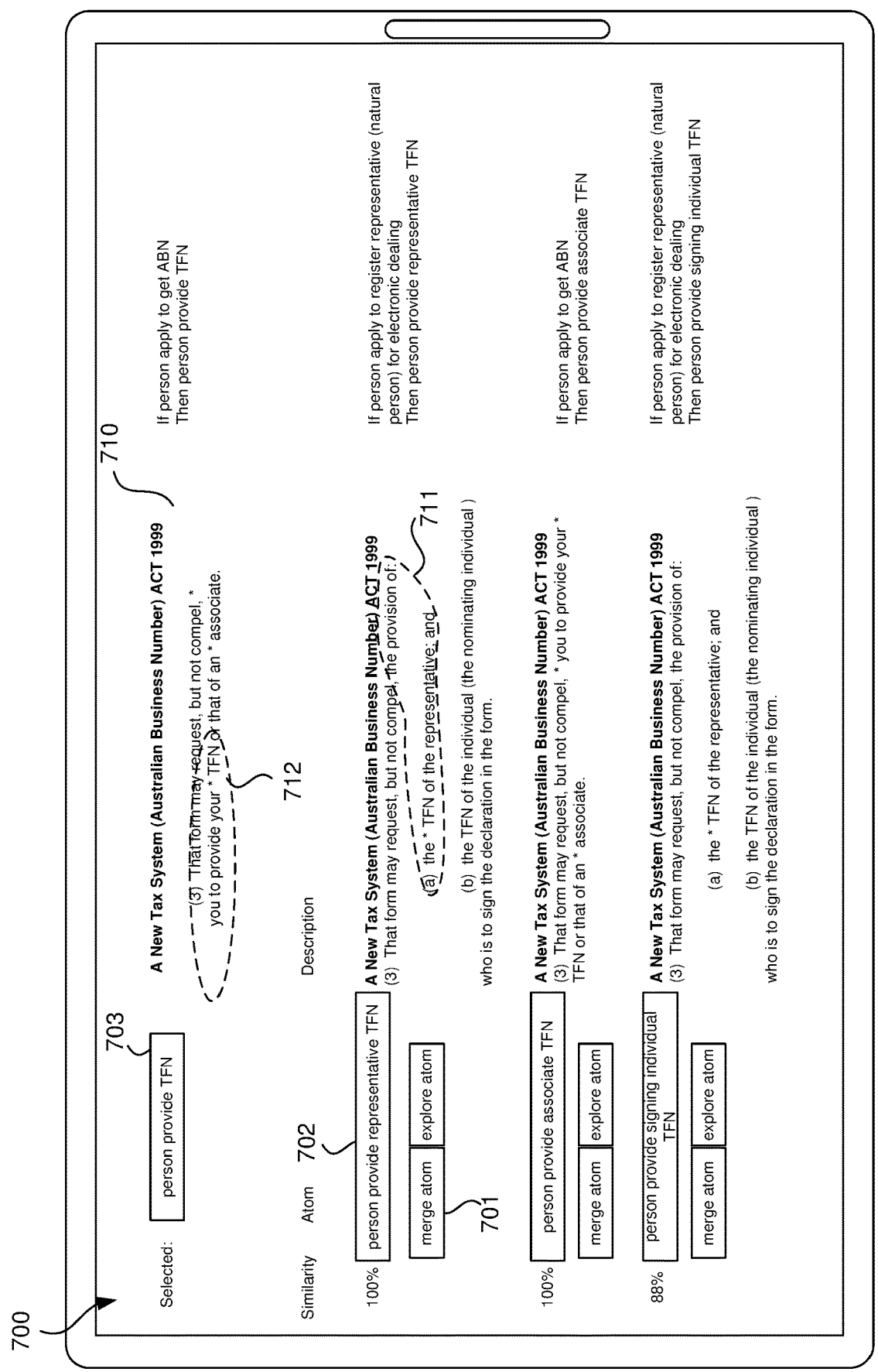
FIG. 7 illustrates an editing user interface.

User interface module 105 then creates an editing user interface 700 as shown in FIG. 7. The editing user interface 700 comprises one or more user input elements, such as "Merge atom" button 701. Button 701 is associated with one of the atomic literals 702 based on the similarity between the one of the atomic literals and a reference atomic literal 703. In other words, processor 100 automatically suggests those literals as merge candidates that are similar to the reference literal.

In this example, the reference literal "person provide TFN" 703 is similar to literal "person provide representative TFN" 702, which is why literal 702 is presented here. User interface 700 further comprises a text column 701 where the legal text is displayed from which the corresponding literal has been extracted.

User interface module 105 monitors user interaction with the user interface 700 to detect user interaction with one of the one or more user input elements, for example, the user clicking on merge button 701. Upon detection of user interaction with the merge button, logic engine 104 merges the atomic literal 702 associated with the merge button with the reference atomic literal 703 in the logic expression. In one example, merging atomic literals comprising replacing the identifier of the atomic literal 702 with the identifier of the reference atomic literal 703 in the logic expression. In another example, merging the atomic literals comprises adding an equality condition that enforces that the atomic literal 702 has the same value as the reference atomic literal 703. It is noted that in FIG. 7 the literals 702 and 703 are represented by their labels and the identifiers in the logic expression may be completely different to the label.

The user interfaces 500, 600 and 700 allow a user assisted refinement of the mapping of the legal text to the logic expression. This allows the use of the proposed methods even in cases where the automatic extraction of literals is not perfect. In particular, in cases where different documents, such as different Acts or Regulations are combined into one logic expression, the different documents may use slightly different phrases for the same meaning. These phrases can be conveniently merged by the user which means the rules from the different legal documents are combined. This means that when the user creates a single assignment as shown with reference to FIGS. 3 and 4, that single assignment is used in all of the combined legal documents.

Method

Figure 8:
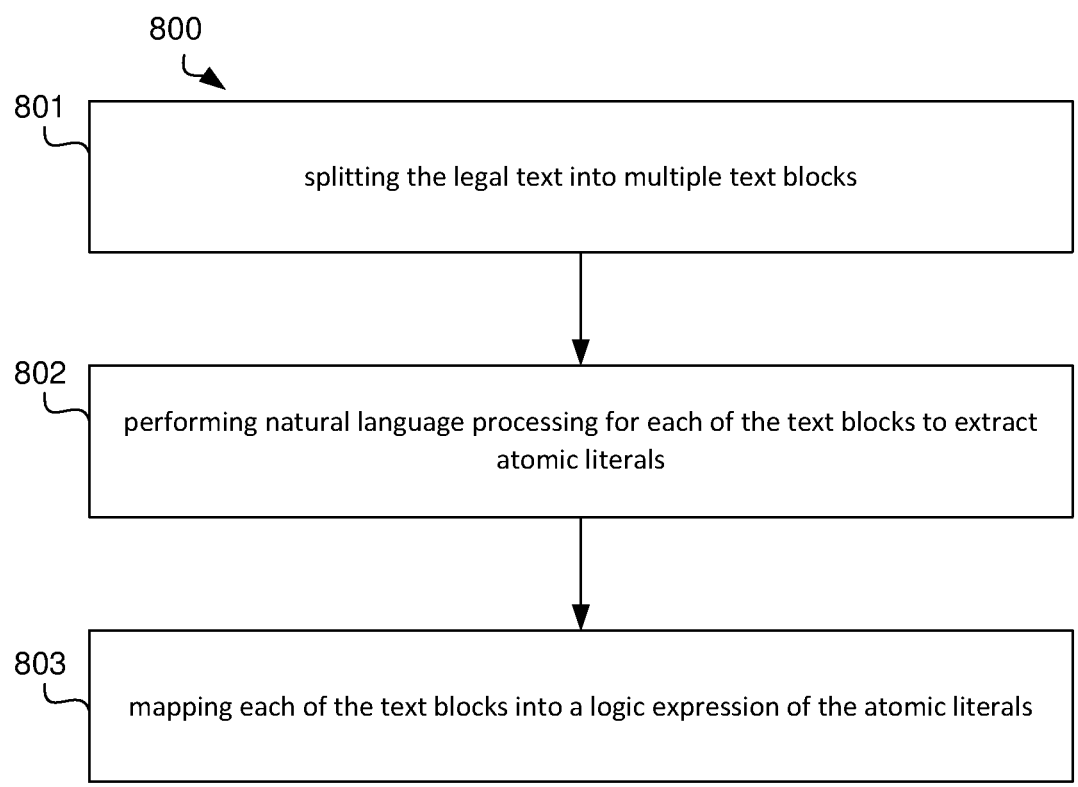
FIG. 8 illustrates a method for creating logic rules from legal text.

FIG. 8 illustrates a method 800 for creating logic rules from legal text as performed by processor 100. FIG. 8 is to be understood as a blueprint for the software program and may be implemented step-by-step, such that each step in FIG. 8 is represented by a function in a programming language, such as C++ or Java. The resulting source code is then compiled and stored as computer executable instructions on program memory 108. The steps of method 800 are essentially identical to the steps described above with reference to language processor 102 and mapper 103.

Method 800 commences by splitting 801 the legal text into multiple text blocks. Method 800 continues by performing 802 natural language processing for each of the text blocks to extract atomic literals corresponding to terms in the legal text. Finally, processor 100 maps 803 each of the text blocks into a logic expression of the atomic literals, the logic expression representing logic rules described by the legal text. Processor 100 may then create user interfaces as described with reference to FIG. 3.

Performance

Set out below are examples for applying the above methods and systems to the given Australian legal texts.

formats based on the realisation that they are ultimately compatible with each other on the logic level.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the

| Legal Text | Coverage | Parse time in s | # fully parsed blocks | # atom-only parsed blocks | # unparsed blocks | # non-empty text blocks |
|---|---|---|---|---|---|---|
| corporations-act1.txt | 60.71% | 1427 | 1444 | 1414 | 103 | 2961 |
| corporations-act2.txt | 68.37% | 2812 | 1813 | 1076 | 156 | 3045 |
| corporations-act3.txt | 68.12% | 874 | 1139 | 711 | 83 | 1933 |
| corporations-act4.txt | 65.02% | 4540 | 2055 | 1473 | 199 | 3727 |
| corporations-act5.txt | 48.60% | 1939 | 785 | 1537 | 84 | 2406 |
| copyright-act.txt | 61.01% | 3191 | 1594 | 1582 | 85 | 3261 |
| food-act.txt | 61.50% | 1076 | 349 | 358 | 6 | 713 |
| new-tax-system-act.txt | 52.83% | 1330 | 1129 | 1564 | 184 | 2877 |
| nsw-enviro-planning-assessment.txt | 64.45% | 3656 | 1314 | 1130 | 33 | 2477 |
| nsw-liquor-act.txt | 63.93% | 1882 | 779 | 666 | 34 | 1479 |
| nsw-local-govt-act-sect68.txt | 25.00% | 4 | 1 | 3 | 3 | 7 |
| nsw-roads-act.txt | 68.35% | 837 | 552 | 384 | 12 | 948 |
| nsw-smoke-free-environment-act.txt | 57.64% | 139 | 63 | 80 | 1 | 144 |
| nsw-smoke-free-environment-regulation.txt | 47.50% | 25 | 10 | 17 | 3 | 30 |
| nsw-state-environmental-planning-policy.txt | 72.88% | 1610 | 701 | 327 | 46 | 1074 |

The above data shows that the proposed systems and methods perform efficiently and provide a good coverage for a short parse time. That is, the disclosed systems and methods provide a technical solution to a technical problem of text processing using limited CPU resources.

It will be appreciated by persons skilled in the art that numerous variations and/or modifications may be made to the specific embodiments without departing from the scope as defined in the claims.

In particular, it is noted that the above description is applicable to a wide range of parsers, mappers and type of logic expressions. This means, the parser, mapper and logic format can be configured to suit the current text block or legislation optimally. The value of the input literals and output values is generally either 'true' or 'false' regardless of which parser, mapper or logic format is used. These values can be readily combined by logic operators, such as 'and' or 'or' operators. In other words, the disclosed method provides a solution for the use of different parsers, mappers and logic computer system memories or registers or other such information storage, transmission or display devices.

The present embodiments are, therefore, to be considered in all respects as illustrative and not restrictive.

The invention claimed is:

1. An online webserver for automated legal advice, the online webserver comprising:
    a legal text data input to receive legal text and splitting the legal text into multiple text blocks;
    a language processor to perform natural language processing on each of the multiple text blocks to extract atomic literals that correspond to terms in the legal text and that are shared across logic expressions for different text blocks;
    a mapper to map the text blocks into a logic expression of the atomic literals;
    a logic engine to evaluate the logic expression based on one or more assignments of the atomic literals;

a user interface module to
  create a user interface comprising multiple user input elements, each of the multiple user input elements being associated with one of the atomic literals,
  monitor user interaction with the user interface to detect user interaction with one of the multiple user input elements,
  upon detection of user interaction with one of the multiple user input elements, creating an assignment of the atomic literal associated with the one of the multiple user input elements and calling the logic engine to evaluate the logic expression based on the created assignment, and
  change the user interface based on evaluating the logic expression to thereby provide legal advice in the form of remaining atomic literals; and
a network connector to communicate with a client device by receiving user input from the client device and provide the user interface to be displayed on the client device.

2. The online webserver of claim 1, wherein the language processor is further configured to determine a parse tree of each of the text blocks and the mapper is configured to map the text blocks into the logic expression based on the parse tree.

3. The online webserver of claim 1, wherein the mapper is further configured to map the text blocks into the logic expression based on heuristics.

4. The online webserver of claim 1, wherein the mapper is further configured to search for an override conjunction ('unless') in that text block and upon finding an override conjunction in that text block at a find position, split the text block at the find position into an earlier first text sub-block before the find position and a second text sub-block after the find position.

5. The online webserver of claim 4, wherein the mapper is further configured to map the first sub-block into a first logic expression and map the second text sub-block into a second logic expression that overrides the first logic expression.

6. The online webserver of claim 1, wherein the mapper is further configured to search for a conditional conjunction in that text block and upon finding a conditional conjunction in that text block, splitting the text block into an earlier first text sub-block and a later second text sub-block.

7. The online webserver of claim 6, wherein the mapper is further configured to map the first sub-block into a first logic expression and map the second text sub-block into a second logic expression that implies the first logic expression.

8. The online webserver of claim 6, wherein splitting the text block is based on a parse tree generated by the language processor and having a first sub-tree and a second sub-tree connected at a node representing the conditional conjunction and the first text sub-block represents the first sub-tree and the second text sub-block represents the second sub-tree.

9. The online webserver of claim 1, wherein the legal text data input is configured to split the legal text into paragraphs.

10. The online webserver of claim 1, wherein the multiple user input elements comprise binary input elements.

11. The online webserver of claim 1, wherein the user interface module is configured to change the user interface by reducing the multiple user input elements.

12. The online webserver of claim 11, wherein reducing the multiple user input elements comprises eliminating, by the logic engine, atomic literals in the logic expression based on the assignment of the atomic literal associated with the one of the multiple user input elements and de-activating, by the user interface module, user input elements associated with the eliminated atomic literals.

13. The online webserver of claim 1, wherein
the language processor is configured to determine a similarity between atomic literals and a reference atomic literal
the user interface module is configured to
  create a user interface comprising one or more user input elements, each of the one or more user input elements being associated with one of the atomic literals based on the similarity between the one of the atomic literals and the reference atomic literal,
  monitor user interaction with the user interface to detect user interaction with one of the one or more user input elements,
  upon detection of user interaction with the one of the one or more user input elements, merging the atomic literal associated with the one of the multiple user input elements with the reference atomic literal in the logic expression.

14. The online webserver of claim 13, wherein the language processor is configured to determine the similarity based on common words between a first part of the legal text associated with each of the atomic literals and a second part of the legal text associated with the reference atomic literal.

15. The online webserver of claim 1, wherein the logic expression is a deontic defeasible logic expression.

16. The online webserver of claim 1, wherein the language processor comprises a Stanford CoreNLP parser.

17. The online webserver of claim 1, wherein the logic engine comprises a SPINdle logic reasoner engine.

18. The online webserver of claim 1, wherein atomic literals comprise numerical literals.

19. The online webserver of claim 1, wherein atomic literals comprise Boolean literals.

20. A method for creating logic rules from legal text, the method comprising:
  receiving the legal text and splitting the legal text into multiple text blocks;
  performing natural language processing for each of the multiple text blocks to extract atomic literals that correspond to terms in the legal text and that are shared across logic expressions for different text blocks;
  mapping each of the text blocks into a logic expression of the atomic literals;
  evaluating the logic expression based on one or more assignments of the atomic literals;
  creating a user interface comprising multiple user input elements, each of the multiple user input elements being associated with one of the atomic literals;
  monitoring user interaction with the user interface to detect user interaction with one of the multiple user input elements;
  upon detection of user interaction with one of the multiple user input elements, creating an assignment of the atomic literal associated with the one of the multiple user input elements and calling the logic engine to evaluate the logic expression based on the created assignment;
  changing the user interface based on evaluating the logic expression to thereby provide legal advice in the form of remaining atomic literals; and
  communicating with a client device by receiving user input from the client device and providing the user interface to be displayed on the client device.

21. The method of claim 20, wherein performing natural language processing comprises determining a parse tree for each of the text blocks and mapping each of the text blocks into the logic expression is based on the parse tree.

22. The method of claim 20, wherein mapping each of the text blocks into the logic expression is based on heuristics.

* * * * *